(12) United States Patent
Chauvrat et al.

(10) Patent No.: US 9,835,240 B2
(45) Date of Patent: Dec. 5, 2017

(54) GEAR REDUCER HAVING A SEALING PLUG PROVIDING AXIAL SUPPORT TO A SPRING FOR GEAR SLACK COMPENSATION

(71) Applicant: JTEKT EUROPE, Irigny (FR)

(72) Inventors: Philippe Chauvrat, Villeneuve (FR); Caroline Gex, Lyons (FR)

(73) Assignee: JTEKT EUROPE, Irigny (FR)

( * ) Notice: Subject to any disclaimer, the term of this patent is extended or adjusted under 35 U.S.C. 154(b) by 0 days.

(21) Appl. No.: 14/649,203

(22) PCT Filed: Nov. 29, 2013

(86) PCT No.: PCT/FR2013/052899
§ 371 (c)(1),
(2) Date: Jun. 2, 2015

(87) PCT Pub. No.: WO2014/087080
PCT Pub. Date: Jun. 12, 2014

(65) Prior Publication Data
US 2016/0201786 A1    Jul. 14, 2016

(30) Foreign Application Priority Data

Dec. 3, 2012  (FR) ...................................... 12 61552

(51) Int. Cl.
*F16H 57/039*    (2012.01)
*B62D 3/04*    (2006.01)
(Continued)

(52) U.S. Cl.
CPC ............. *F16H 57/039* (2013.01); *B62D 3/04* (2013.01); *B62D 5/0409* (2013.01);
(Continued)

(58) Field of Classification Search
CPC . F16H 1/16; F16H 55/24; F16H 57/12; F16H 57/029; F16H 57/039;
(Continued)

(56) References Cited

U.S. PATENT DOCUMENTS 3,108,666 A * 10/1963 Holton .................... F16B 5/125
24/295
2009/0134114 A1* 5/2009 Thilly .................. B65D 51/002
215/247

FOREIGN PATENT DOCUMENTS

EP    1671871 A1    6/2006
EP    2428430 A1    3/2012
(Continued)

OTHER PUBLICATIONS

International Search Report dated Jun. 16, 2014 re: Application No. PCT/FR2013/052899; citing: EP 2 492 167 A1, EP 2 428 430 A1 and EP 1 671 871 A1.

*Primary Examiner* — Joseph M Rocca
*Assistant Examiner* — Felicia L. Brittman
(74) *Attorney, Agent, or Firm* — Oliff PLC

(57) ABSTRACT

The invention relates to a gear reducer (1) for an assisted-steering module, including a casing (3), a worm (4) which meshes with a worm wheel (6), and a spring (10) for taking up gear play, which presses said worm (4) radially against the worm wheel (6), the wall of the casing (3) being bored, away from of the axis (XX') of the worm, with an opening (14) sealed by a plug (15), the spring (10) for taking up gear play including at least one retaining lug (17, 18) which projects radially to the axis (XX') of the worm (4), and the hub (20) of the plug (15) having a guiding wall (21) that is substantially transverse to the axis (XX') of the worm (4), which is designed to be placed axially opposite said at least one retaining lug (17, 18), in order to prevent the axial movement of the spring (10) beyond a predetermined functional travel.

15 Claims, 1 Drawing Sheet

(51) Int. Cl.
*B62D 5/04*     (2006.01)
*F16H 1/16*     (2006.01)
*F16H 57/12*    (2006.01)
*F16H 55/24*    (2006.01)
*B65D 51/00*    (2006.01)
*F16H 57/029*   (2012.01)
*F16H 57/021*   (2012.01)
*F16H 57/022*   (2012.01)
*F16H 57/02*    (2012.01)

(52) U.S. Cl.
CPC ........... *B62D 5/0421* (2013.01); *B65D 51/00* (2013.01); *F16H 1/16* (2013.01); *F16H 55/24* (2013.01); *F16H 57/029* (2013.01); *F16H 57/12* (2013.01); *F16H 2057/0213* (2013.01); *F16H 2057/0222* (2013.01); *F16H 2057/02082* (2013.01); *F16H 2057/127* (2013.01)

(58) Field of Classification Search
CPC ..... F16H 2057/0213; F16H 2057/0222; F16H 2057/02082; F16H 2057/127; F62D 3/04; F62D 5/0409; F62D 5/0421; B65D 51/00
USPC ........................................................ 180/444
See application file for complete search history.

(56)             References Cited

FOREIGN PATENT DOCUMENTS

EP          2492167 A1 *  8/2012  ........... B62D 5/0409
JP       2007285472 A  * 11/2007

\* cited by examiner

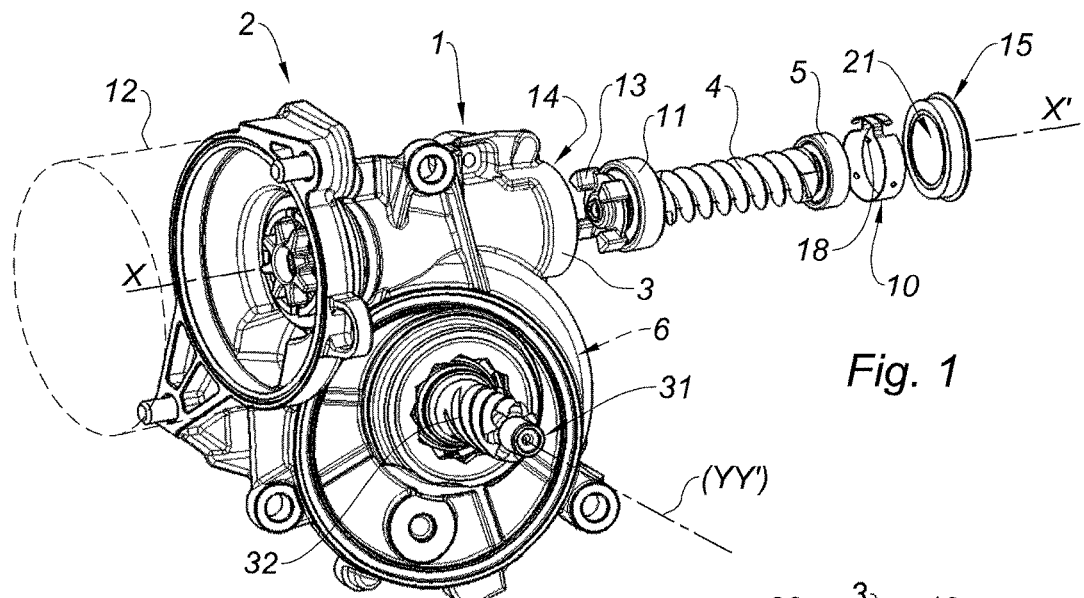
Fig. 1
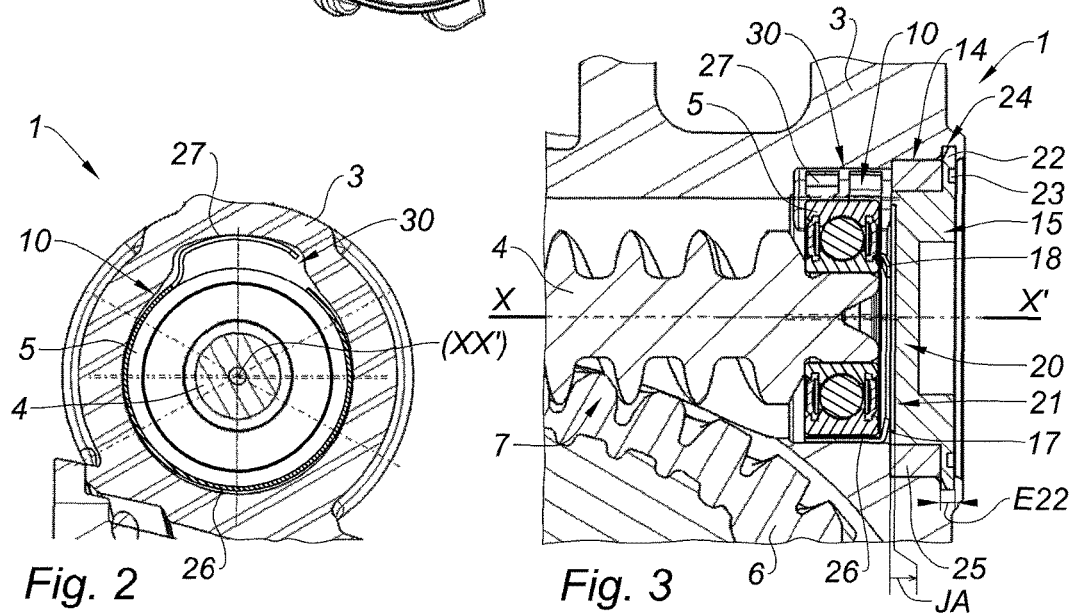
Fig. 2
Fig. 3
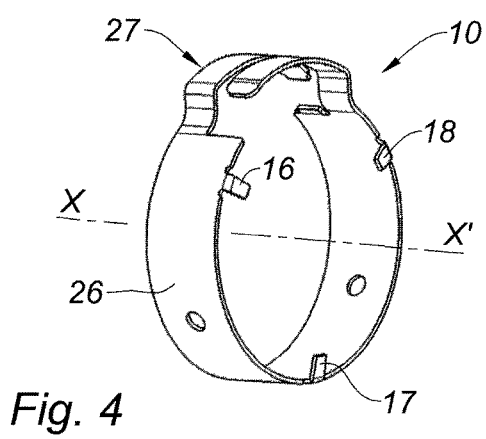
Fig. 4
Fig. 5

GEAR REDUCER HAVING A SEALING PLUG PROVIDING AXIAL SUPPORT TO A SPRING FOR GEAR SLACK COMPENSATION

TECHNICAL FIELD

The present invention relates to the general field of power assisted steering modules, and more particularly to gear reducers used within such modules.

BACKGROUND

It is known to have in power assisted steering modules and more particularly in electric power assisted modules, a gear reducer comprising a worm which is driven by the assistance motor and which meshes on a worm wheel coupled to the output shaft of the power assisted steering module.

In order to compensate for the gear slack, and thus limit parasitic noise, in particular when the torque transmitted by the reducer is low, it is also known to interpose, between the casing of the power assisted steering module and one of the bearings supporting the worm, a spring designed for pressing said worm radially against the toothing of the worm wheel.

However, it may occur that, as a result of in particular vibrations to which the power assisted steering module is subjected, the spring is displaced along the axis of the worm, to the extent that a noticeable decrease of its useful range of slack compensation is observed, and hence a risk that shocks between teeth and parasitic noise appear or intensify.

BRIEF SUMMARY

Consequently, the invention aims at remedying to the aforementioned drawbacks and proposing a new gear reducer arrangement providing, in a simple and cheap manner, a gear slack compensation which is durably efficient.

The invention more particularly provides a gear reducer comprising a casing, a worm which is rotationally mounted in said casing by at least one first bearing, such as a ball bearing, and which meshes with a worm wheel, said reducer also comprising a gear slack compensation spring interposed between the casing and the first bearing in order to press said worm radially against the toothing of the worm wheel, the wall of the casing being bored, in the extension of the axis of the worm, with an opening blocked by a plug, said reducer being characterized in that the gear slack compensation spring comprises at least one retaining lug which protrudes radially to the axis of the worm and in that the hub of the plug has a guiding wall substantially transverse to the axis of the worm, which is designed to be placed axially facing said at least one retaining lug, in such a manner as to cooperate with said at least one retaining lug for preventing the axial displacement of the spring beyond a predetermined functional travel.

Advantageously, the use of the plug, and more particularly of the terminal wall of the hub thereof, as axial stop for maintaining the slack compensation spring in position allows limiting to a strict functional minimum the axial displacements of said spring, so that said spring is preserved from axial drifting, and substantially keeps its position along the worm, and as a result remains in all circumstances within an optimal operating range, within which said spring has a good radial deformation amplitude associated with sufficient stiffness, whatever the level of deformation thereof.

In other words, thanks to the invention, the slack compensation spring permanently keeps its capacity of efficiently forcing, with a sufficient stress level, the worm to radially come closer against the worm wheel, and thereby preventing any loosening liable in generating shocks and parasitic noise.

Obviously, the plug will nevertheless be arranged in such a manner as to create a certain axial clearance, corresponding to the slight but necessary functional axial travel of the spring (while being designed for preventing the spring from moving beyond this functional axial travel, such as it has been stated above).

Such a functional axial clearing will allow the mechanism to accommodate, without jamming, the axial travel component of the spring which is liable to go with the radial deviation of said spring, of the bearing and the worm, when said worm tends, according to the instantaneous configuration of the mechanism and according, among others, to the manufacturing and assembling tolerances of the worm and the worm wheel, to move closer to or away from the axis of rotation of the worm wheel.

The worm will thus be able to remain in permanently pre-stressed contact with the worm wheel, and optionally radially oscillate to this end, in a cyclic manner, over the course of the rotation thereof and the rotation of the worm wheel.

Advantageously, the important extent of the guiding wall capable of cooperating with the retaining lugs of the spring further allows offering said spring a particularly stable and precise guiding, whatever in particular the radial position of said spring and worm or, if need be, whatever the orientation of said spring around the axis of said worm.

Advantageously, the arrangement in accordance with the invention further allows using one and the same piece, for instance the plug, for closing the casing as well as for ensuring keeping the slack compensation spring in position, without it being necessary to provide other intermediate pieces, thus imparting the invention with a particularly simple, compact and light character, and making said invention cheap to implement.

In addition, by using the plug to directly provide the slack compensation spring with a retaining wall, the chain of dimensions is simplified which defines, via the casing, the functional axial clearance given to said spring, by limiting the sources of errors linked to manufacturing and assembling tolerances, thus allowing the mechanism to be more precise at a lesser cost.

BRIEF DESCRIPTION OF THE DRAWINGS

Other features and advantages of the invention will become more apparent upon reading the following description, as well as with the aid of the accompanying drawings, provided by way of non-limiting, and purely illustrative purposes, among which:

FIG. 1 illustrates, according to an exploded perspective overall view, an example of reducer for a power assisted steering module in accordance with the invention.

FIG. 2 illustrates, according to a partial sectional view, in the median plane of the slack compensation spring, normal to the axis of the worm, the arrangement detail of said slack compensation spring within the casing of the reducer of FIG. 1.

FIG. 3 illustrates, according to a partial longitudinal sectional view according to the axis of the worm, the arrangement detail of the reducer of FIGS. 1 and 2.

FIG. 4 illustrates, according to a perspective overall view, the variant of the slack compensation spring used within the reducer of FIGS. 1 to 3.

FIG. 5 illustrates, according to a perspective overall view, the variant of the plug used within the reducer of FIGS. 1 to 3.

DETAILED DESCRIPTION

The present invention relates to a gear reducer 1, and more particularly a gear reducer suitable for a power assisted steering module 2 intended to assist driving a vehicle, of the motor vehicle type.

In this respect, said reducer 1 will be preferably arranged in such a manner as to be able to deliver a torque reaching between 20 N·m and 110 N·m.

Such as is in particular illustrated on FIGS. 1 and 3, the reducer 1 comprises a casing 3, for example made of aluminum alloy or of composite material with a fiber reinforced polymer matrix.

The reducer 1 also comprises a worm 4 which is rotationally mounted in said casing 3 by at least one first bearing 5, such as a ball bearing, and which meshes with a worm wheel 6.

Typically, the axis of rotation (XX') of the worm and the axis of rotation (YY') of the worm wheel 6 are superimposed and crossed, and are preferably perpendicular (although other configurations are to be considered), in such a manner that the worm 4 meshes in a tangential manner on the toothing 7 of the wheel 6 in order to drive the latter.

The reducer 1 also comprises a gear slack compensation spring 10 interposed between the casing 3 and the first bearing 5 in order to press the worm 4 radially against the toothing 7 of the worm wheel 6.

It is to be noted that by "radial", or "radially", reference is being made, unless otherwise specified, to one or the other directions which are transverse, and more particularly substantially perpendicular, to the axis (XX') of rotation of the worm 4, or even to the distances which are measured along such a direction with respect to said axis.

Preferably, said spring 10 directly bears against the casing 3, in a recess such as a jacket hollowed out in said casing 3, so that said spring can exert on the worm 4 a substantially radial pre-constraint which tends to push back said worm towards the axis (YY') of the wheel 6.

Advantageously, said spring 10 forms an operating slack compensation spring for compensating the slack between teeth (i.e. a "anti-backlash" spring), which improves the quality of the meshing by maintaining the worm 4 in contact with the toothing 7 of the wheel 6.

To this end, worm 4 and first bearing 5 form an element which is moveably mounted with respect to the casing 3, and subjected to the return force exerted by the spring 10.

The radial travel of the moveable element 4, 5 will obviously be sufficient for allowing said moveable element to accommodate contact configuration variations due in particular to the geometric defects of the pieces or the assembly, to wear, or to differential heat dilation phenomena.

To this end, the worm 4 may in particular be carried, at the end of said worm opposite to the end of said worm which is carried by the first bearing 5, by a second bearing 11 of ball joint type, and coupled to the assistance motor 12 by a flexible coupling 13, of the type elastic pawl, such as that is illustrated on FIG. 1.

According to the invention, the wall of the casing 3 is bored, in the extension of the axis (XX') of the worm 4, by an opening 14 closed by a plug 15.

In a particularly preferential manner, the opening 14 will form an access opening designed for allowing the introduction into the casing 3 and mounting in said casing 3 of at least the first bearing 5 and/or of the spring 10, or even also of the worm 4.

Said opening 14 may also be useful during maintenance operations, for example in order to conduct a draining or on the contrary for an intake of lubricant (for example grease).

The plug 15 will advantageously ensure, after assembling and during operation, the sealing of the casing 3, and more particularly the sealing with respect to the lubricant, dust, and/or to projections of water.

According to the invention, the gear slack compensation spring 10 comprises at least a retaining lug 16, 17, 18 which protrudes radially to the axis (XX') of the worm 4, and the hub 20 of the plug 15 has a guiding wall 21 substantially transverse to the axis (XX') of the worm 4.

Said guiding wall 21 is advantageously designed to be placed axially facing said at least one retaining lug 16, 17, 18 in such a manner as to be able to cooperate with said at least one retaining lug 16, 17, 18 so as to prevent the axial displacement of the spring 10 beyond a predetermined functional travel.

Advantageously, the guiding wall 21 will be axially placed at a predetermined functional nominal distance from the lug or lugs, said functional distance being chosen in such a manner as to form a clearing sufficient for allowing the axial travel (functional travel) of said lug 16, 17, 18, and more globally of all or part of the spring 10, when said lug 16, 17, 18 accompanies the moveable element formed by the worm 4 and the first bearing 5 during the radial dynamic movements for adapting the gear slack compensation.

However, said functional distance will also be sufficiently reduced for allowing the guiding wall 21 to interact with the lug 16, 17, 18 by erecting, in opposition to the axial displacement of said lug 16, 17, 18 along the worm, in the direction of the plug 15, an end of travel stop which thus allows limiting the axial travel of said lug, and consequently the axial travel of the spring 10 to which said lug is fastened, below a predefined limit, materialized by said guiding wall 21.

Thus, the plug 15 is not only used as member for closing and sealing the casing 3, but also and especially as axial limit designed for maintaining the spring 10 in place, that is to say within an axial position range in every point of which the spring 10 has an acceptable mechanical behavior, enabling said spring to permanently maintain an efficient radial slack compensation constraint on the worm 4.

In this respect, the axial clearance $J_A$ formed between the at least one retaining lug 16, 17, 18 and the guiding wall 21 is preferably lower than or equal to 2 mm, preferably lower than or equal to 1 mm, or even 0.8 mm, and preferentially higher than or equal to 0.3 mm, or even 0.5 mm.

Advantageously, by providing, according to the applicable chain of dimensions, a non-zero nominal axial clearance $J_A$, the radial travel capacity of the moveable element 4, 5 and the lugs 16, 17, 18, is preserved without however leaving a superfluous axial space, which would be prejudicial for the stability and efficiency of the gear slack compensation.

In a particularly preferential manner, the guiding wall 21 is substantially planar, and preferably substantially normal to the axis (XX') of the worm 4.

Said guiding wall 21 thereby preferably forms a ramp for radial sliding, in the contact of which the lug or lugs 16, 17, 18 may radially slide, without being hindered, during the gear slack compensation movements, particularly when the worm 4 swings in flexion in its second bearing 11.

The guiding wall 21 preferably forms the solid central terminal wall of the plug 15, located substantially at the axial end of said plug, in direction of the worm 4, towards the inside of the casing 3.

Furthermore, as shown in FIGS. 1, 3 and 5, the plug 15 preferably has a cylindrical shape of revolution, of which the generating axis will preferably correspond to the axis (XX') of rotation of the worm 4, and will be assimilated to said axis (XX') for the ease of the description.

Preferably, as notably visible in FIGS. 3 and 5, the hub 20 of the plug 15 forms an axially recessed solid cylinder, wherein the bottom of the axial recess forms the guiding wall 21.

The axially protruding ends of the lugs 16, 17, 18 can thus come into abutment within the recess.

The axial depth of said recess, corresponding to the height of the circular rim which delimits said recess radially, may advantageously be suited on a case-by-case basis according to the required axial clearance $J_A$, and may in particular substantially correspond to the functional axial clearance $J_A$ provided between the axially protruding ends of the lugs 16, 17, 18 and the guiding wall 21.

Furthermore, the plug 15 preferably has, as notably shown in FIGS. 3 and 5, an axially staged structure, which comprises the hub 20, oriented towards the spring 10, then a flange 22, oriented towards the outside of the casing 3, wherein the (overall) diameter D22 of said flange 22 is higher than the diameter of said hub 20, in such a manner that said flange 22 forms a shoulder with respect to said hub 20.

According to a preferential feature which may constitute an invention in its own right, the flange 22 forms an elastic clip allowing the fixing of the plug 15 to the casing 3 by encasing.

According to a variant, the flange 22 may be integrally formed with the hub 20, and more particularly be formed from a hard plastic material, of polyamide or polyacetal (POM) type, of which the shape and dimensions will be suitable for imparting said flange with both the required resistance and elasticity for the placing thereof then the maintaining thereof in the opening 14.

The flexibility of the flange 22 may in particular be improved by hollowing out a circular weakening groove 23, concentric with the edge of said flange 22, as shown in FIG. 3.

According to another variant, the flange 22 could be produced from a flexible plastic material, of elastomeric type, for example in thermoplastic polyurethane, which will be secured to the hub 20, for example by over molding.

Advantageously, the flange 22 will allow a rapid and simple fixing of the plug 15 by snap-fitting onto the casing 3, and more particularly in a groove 24 hollowed out in the wall of said casing 3, on the periphery of the opening 14.

In this respect, it is worth noting that the opening 14 and the plug 15 could be advantageously devoid of thread, thereby making the manufacture thereof simpler.

Preferably, the hub 20, and possibly the flange 22, is (are) produced in one single piece from a stiff polymer material, preferably polyamide of PA66 type or polyoxymethylene.

The plug 15 may thus have a monolithic core 20, 22 made of hard plastic, combining lightness and excellent corrosion resistance.

Such a core 20, 22 will be further particularly simple and rapid to manufacture, for example by injection molding or by machining.

According to a variant, the hub 20 is provided, on the periphery thereof, of an annular sealing lining 25 of flexible polymer material, preferably produced by over molding.

Advantageously, the use of a sealing lining 25 forming an integral part of the plug 15, by manufacture, will allow a simplified, rapid and reproducible mounting, of said plug 15 onto the casing 3.

Preferably, said sealing lining 25 will not only press radially on the hub 20, but will also lean axially against the shoulder formed by the flange 22. Thus, by means of one and the same piece, a particularly efficient radial as well as axial sealing, will be ensured.

The flexible polymer material constituting the sealing lining 25 may be thermoplastic elastomer (TPE), and particularly thermoplastic polyurethane (TPU). By way of reference, the hub 20, and more particularly the hard part thereof (apart from sealing lining 25), may have a diameter substantially between 25 mm and 33 mm (which corresponds to the inner diameter of the sealing lining 25, if any).

The sealing lining 25 may have an outer diameter substantially between 35 mm and 36 mm, and the flange 22 an overall diameter D22 substantially between 36 mm and 38 mm.

The rough thickness E22 of the flange 22 may be between 1 mm and 2 mm and, if any, the (axial) depth of the weakening groove 23 may be between 0.5 mm and 1.5 mm.

As shown in FIG. 4, the gear slack compensation spring 10 preferably includes a plurality of retaining lugs 16, 17, 18, and preferably three retaining lugs 16, 17, 18, distributed angularly, preferably at regular intervals, around the axis (XX') of the worm 4 and designed to be able to cooperate with the guiding wall 21 of the plug 15.

Advantageously, the use of several bearing points remote one from the other, and more particularly three lugs 16, 17, 18 forming three bearing points by which a unique plane (geometrically) passes, allows obtaining a stable and balanced support of the spring 10 against the guiding wall 21, of sliding flat contact face type (plane on plane).

Such a kinematic connection in quasi "perfect" flat contact face advantageously allows a free functional radial sliding, with little friction, of the movable element 4, 5 and the lugs 16, 17, 18 which are embedded therein, while preventing the spring 10 from axially shifting, or even from tipping or possibly frictionally jamming with respect to the axis (XX') of the worm 4.

Preferably, the slack compensation spring 10 includes an annular blade 26 which is wound (or, more globally, which is designed to be wound) in a coil, thickness-wise, around the first bearing 5.

Advantageously, the retaining lug or lugs 16, 17, 18 may hence be formed by tabs integrally formed with the edge of said blade 26 and folded radially.

Such a spring may be manufactured in a simple manner, based on the cutting out and folding of a same ribbon sheet, preferably metallic.

The retaining lugs 16, 17, 18, secant to the blade 26, will furthermore be advantageously slanted, in such a manner as to substantially follow a fictive cone-shaped envelope.

In this respect, the retaining lugs 16, 17, 18 will preferably have both an axial extension component (oriented towards the outside of the spring 10, in the direction of the plug 15) and a radial extension component (oriented towards the axis (XX')), said radial extension component being preferentially majoritarian, that is to say more important than the axial extension component.

Preferably, the blade 26 will angularly cover the majority, or even the quasi-totality of the first bearing 5, and more particularly the external ring of the ball bearing, by substantially forming a turnaround said bearing 5.

Preferably, as notably shown in FIGS. 2 to 4, the slack compensation spring 10 includes a heel 27, said heel 27 being engaged, radially offset from the first bearing 5, in a groove 30 which is formed in the casing 3, preferentially parallel with the axis (XX'), and thus notably in order to block the rotation of said spring 10 around the axis (XX') of the worm 4.

Said heel 27 forms an outer radial protrusion, which marks a radial alignment discontinuity with respect to the portion of the blade 26 which fits closely the curvature of the first bearing 5.

Advantageously, said heel 27 elastically bears against the bottom of the groove 30, in order to be able to create and exert the radial slack compensation constraint on the bearing 5, and consequently on the worm 4.

To this end, the heel 27 may advantageously be curved substantially in a U shape to form a stirrup, radially projecting from the blade 26 and the bearing 5, wherein the radially external back of said stirrup bears against the bottom of the groove 30.

Advantageously, the heel 27 may thus ensure a dual function of radially compressing the worm 4 and restraining the spring 10 from rotating.

Preferably, the heel 27 is integrally formed with the blade 26, of which said heel preferentially constitutes an extreme extension.

In this respect, it is worth noting that the heel 27 may advantageously be split, transversally to the axis (XX'), as shown in FIGS. 3 and 4, by being more particularly constituted by the axial juxtaposition of the two ends of the blade 26, which angularly overlap on a portion of the circumference of the spring 10.

Said ends may each for this purpose have a width (axial extent) lower than or equal to the half-width (axial extent) of the blade 26, while the width of the blade can moreover be substantially equal to the width (axial extent) of the first bearing 5.

Advantageously, such a spring 10 arrangement, which globally integrally forms an open deformable coil, ensures the flexibility, balance, and sturdiness of the elastic suspension which ensures the gear slack compensation. It also allows simple manufacturing.

As notably shown in FIGS. 1 to 3, the spring 10 will advantageously be engaged freely on the outer rim of the first bearing 5, and more particularly on the radially external rim of the external race of the ball bearing, the axis of said spring 10 being further preferably coincident with that (XX') of the worm 4 and/or the bearing 5.

In a particularly preferential manner, the retaining lug or lugs 16, 17, 18 form one or more bidirectional retaining members, arranged in such a manner as to be able to cooperate on the one hand with the first bearing 5, in order to block the axial translation of the spring 10 in a first direction going towards the gear area at which the worm 4 comes in contact with the worm wheel 6, and on the other hand with the guiding wall 21 of the plug 15, in order to block the translation of said spring 10 in a second direction opposite to the first direction, i.e. here in order to block the translation of said spring 10 in the direction of the plug 15 and the outside of the casing 3.

The same retaining lugs 16, 17, 18, axially maintained captive in a section between the edge of the first bearing 5 and the guiding wall 21, may hence simultaneously ensure the axial maintaining of the spring in both directions, thus enabling axially holding the spring in a very effective manner, at low cost, by a simple and compact mounting.

The invention obviously relates to a power assisted steering module 2 as such, which is provided with a gear reducer 1 according to the invention, the worm 4 of which is driven by an electric assist motor 12 (outlined in dots on FIG. 1), and of which the worm wheel 6 is designed to exert, according to predefined assistance laws, an assistance torque on an output shaft 31 intended to be coupled with a steering column or a steering rack.

In a preferential manner, the output shaft 31 will carry a pinion 32 intended to be engaged on a steering rack (not shown), of which the translation controls, via steering tie rods connected to stub axles, the azimuth orientation of the guide wheels of the vehicle.

The invention also relates to a steering system equipped with an power assisted steering module 2 according to the invention, as well as a vehicle, and more particularly a motor vehicle, of the type wheeled vehicle, intended for example for transporting individuals or merchandise, which is provided with such a steering system.

The invention finally relates to a plug 15 as such, said plug being made of plastic material and being intended for a casing 3 of an power assisted steering module 2, said plug 15 comprising on the one hand a core 20, 22 made of stiff plastic material which forms in one single piece a solid hub 20 offering a guiding wall 21 substantially planar and normal to the generating axis (XX') of said plug, and a flange 22 which marks a radially external shoulder with respect to said hub 20, at an axial distance from the guiding wall 21, while forming an elastic fixing clip, and on the other hand an annular sealing lining 25 made of elastomer, added and fixed, preferably by over molding, on said core 20, 22 in such a manner as to surround the periphery of the hub 20.

Advantageously, such a plug 15 will have multiple functions, ensuring by itself fixing thereof to the casing 3 on which said plug is inserted, sealing of said casing 3, and controlling the axial travel of the gear slack compensation spring 10, since the guiding wall 21 materializes one of the limits of the functional axial travel of the spring 10, thus preventing said spring 10 from being displaced axially beyond said functional travel.

The production of the plug 15 integrally in one or several plastic materials, or possibly composite with fiber reinforced polymer matrix, will further advantageously ensure lightness and corrosion resistance of said plug 15.

The hub 20 may further be recessed such as it has been described above.

Obviously, the invention is in no way limited to the variants exposed above, the one skilled in the art being in particular able of isolating or freely combining one and/or the other of the features described above.

The invention claimed is:

1. A gear reducer comprising
a casing,
a worm which is rotationally mounted in said casing by at least one first bearing and which meshes with a worm wheel, and
a gear slack compensation spring interposed between the casing and the first bearing in order to press said worm radially against the toothing of the worm wheel,
wherein a wall of the casing is bored, in an extension of an axis of the worm, with an opening blocked by a plug having a hub,
wherein the gear slack compensation spring comprises at least one retaining lug which protrudes radially to the axis of the worm, and the hub of the plug has a guiding wall substantially transverse to the axis of the worm, which is designed to be placed axially facing said at least one retaining lug, in such a manner as to cooperate with said at least one retaining lug for preventing the axial displacement of the spring beyond a predetermined functional travel, and wherein the hub forms an axially recessed solid cylinder, wherein a bottom of the axial recess in said cylinder forms the guiding wall, so that the at least one retaining lug can come into abutment against said guiding wall within said recess.

2. The reducer according to claim 1, wherein the plug has an axially staged structure, which comprises the hub, oriented towards the spring, then a flange, oriented towards an outside of the casing, wherein the diameter of said flange is greater than the diameter of said hub, in such a manner that said flange forms a shoulder with respect to said hub.

3. The reducer according to claim 2 wherein the flange forms an elastic clip allowing the fixing of the plug to the casing by encasing.

4. The reducer according to claim 1 wherein an axial clearance formed between the at least one retaining lug and the guiding wall is lower than or equal to 2 mm.

5. The reducer according to claim 4 wherein the axial clearance is greater than 0.3 mm and lower than 1 mm.

6. The reducer according to claim 1 wherein the hub is provided, on a periphery thereof, an annular sealing lining of flexible polymer material.

7. The reducer according to claim 1 wherein the hub is produced in one single piece from a stiff polymer material.

8. The reducer according to claim 1 wherein the gear slack compensation spring includes a plurality of retaining lugs, distributed angularly around the axis of the worm and designed to be able to cooperate with the guiding wall of the plug.

9. The reducer according to claim 1 wherein the retaining lug or lugs form one or more bidirectional retaining members, arranged in such a manner as to be able to cooperate with the first bearing, in order to block the axial translation of the spring in a first direction going towards the gear area at which the worm comes in contact with the worm wheel, and with the guiding wall of the plug, in order to block the translation of said spring in a second direction opposite to the first direction.

10. The reducer according to claim 1 wherein the slack compensation spring includes an annular blade which is wound in a coil, thickness-wise, around the first bearing, the retaining lug or lugs being formed by tabs integrally formed with the edge of said blade and folded radially.

11. The reducer according to claim 1 wherein the slack compensation spring includes a heel which is engaged, radially offset from the first bearing, in a groove formed in the casing, in order to block the rotation of said spring around the axis of the worm.

12. A power assisted steering module provided with a gear reducer according to claim 1, the worm of which is driven by an electric assist motor, and of which the worm wheel is designed to exert an assistance torque on an output shaft intended to be coupled with a steering column or a steering rack.

13. The reducer according to claim 1 wherein:
an axial clearance formed between the at least one retaining lug and the guiding wall is lower than or equal to 2 mm, and
the hub has a rim that radially delimits the recess and wherein the axial depth of said recess, which corresponds to the height of said rim, is equal to the required axial clearance.

14. The reducer according to claim 1 wherein:
an axial clearance formed between the at least one retaining lug and the guiding wall is greater than 0.3 mm and lower than 1 mm, and
the hub has a rim that radially delimits the recess and wherein the axial depth of said recess, which corresponds to the height of said rim, is equal to the required axial clearance.

15. A method comprising using a plug as an axial stop for maintaining a gear slack compensation spring in position within a gear reducer, said gear reducer comprising
a casing,
a worm which is rotationally mounted in said casing by at least one first bearing, and which meshes with a worm wheel, and
wherein the gear slack compensation spring is interposed between the casing and the first bearing in order to press said worm radially against the toothing of the worm wheel,
wherein a wall of the casing is bored, in an extension of an axis of the worm, with an opening blocked by the plug, said plug having a hub,
wherein the gear slack compensation spring comprises at least one retaining lug which protrudes radially to the axis of the worm,
the method comprising:
providing a hub of the plug that forms an axially recessed cylinder, wherein a bottom of the axial recess in said cylinder forms a guiding wall,
placing said guiding wall substantially transverse to the axis of the worm and axially facing the at least one retaining lug, and
making the at least one retaining lug come into abutment against the guiding wall within the recess, so that said at least one retaining lug and the gear slack compensation spring are axially supported against the guiding wall, thus allowing a free radial sliding of said retaining lug and said gear slack compensation spring against the guiding wall while preventing the axial displacement of the spring beyond the guiding wall.

* * * * *